United States Patent [19]

Mavrovic

[11] 3,886,210

[45] *May 27, 1975

[54] UREA SYNTHESIS WITH IMPROVED HEAT RECOVERY AND AMMONIUM CARBAMATE RECIRCULATION

[76] Inventor: Ivo Mavrovic, 530 E. 72nd St., New York, N.Y.

[ * ] Notice: The portion of the term of this patent subsequent to Sept. 18, 1990, has been disclaimed.

[22] Filed: June 13, 1973

[21] Appl. No.: 369,756

Related U.S. Application Data

[63] Continuation-in-part of Ser. No. 50,777, June 29, 1970, Pat. No. 3,759,992.

[52] U.S. Cl. ............................................. 260/555 A
[51] Int. Cl. ........................................ C07c 127/00
[58] Field of Search ................................. 260/555 A

[56] References Cited
UNITED STATES PATENTS
3,759,992  9/1973  Mavrovic ........................... 260/555

Primary Examiner—Joseph E. Evans
Assistant Examiner—A. Siegel
Attorney, Agent, or Firm—Flynn & Frishauf

[57] ABSTRACT

Urea process in which part of the fresh $CO_2$ reactor feed is reacted to carbamate with ammonia gas contained in decomposer off-gas, in presence of urea and water. Exothermic heat of reaction thereof is internally recovered in indirect heat exchange with the reactor effluent let down in pressure for carbamate decomposition and excess ammonia evaporation, and producing said off-gas in the carbamate decomposer. Part of the total heat required in the carbamate decomposer for complete carbamate decomposition is supplied by reacting fresh $CO_2$ feed with the off-gas from the carbamate decomposer in a first decomposing zone. The remaining part of the heat of decomposition can be supplied by indirect steam heating in a second decomposing zone directly following the first such zone.

After substantial completion of the reaction of the fresh $CO_2$ feed with the ammonia from the decomposer off-gas to form carbamate, the resulting solution is further cooled in a separate cooler and fresh ammonia feed is supplied to the cooler and dissolved in the carbamate solution for the purpose of increasing the molar ratio of $HN_3$ to $CO_2$ in the carbamate solution above about 3.8 to one. The final aqueous ammoniacal solution of ammonium carbamate containing urea thus obtained, is introduced into the urea reactor with the remaining part of the fresh $CO_2$ and $NH_3$ feeds to form urea.

12 Claims, 3 Drawing Figures

UREA SYNTHESIS WITH IMPROVED HEAT RECOVERY AND AMMONIUM CARBAMATE RECIRCULATION

RELATED APPLICATIONS

This application is a continuation-in-part of application Ser. No. 50,777 filed June 29, 1970 now U.S. Pat. No. 3,759,992. It is related to application Ser. No. 223,511, filed Feb. 4, 1972, which is a division of Ser. No. 50,777.

FIELD OF THE INVENTION

This invention has to do with the synthesis of urea from ammonia and carbon dioxide. More particularly, it has to do with improvements realized in processing of an urea reactor effluent with increased heat recovery and with improved ammonium carbamate recirculation.

BACKGROUND OF THE INVENTION

As described in my U.S. application Ser. No. 50,777, urea is synthesized in a reactor at elevated pressure and temperature from ammonia and carbon dioxide. Carbamate is first formed, which is subsequently dehydrated to urea. The urea forming carbamate does not have to be formed necessarily in the same vessel in which it undergoes dehydration to urea; for example, it can be formed in total amount or in part in another vessel at lower operating pressure and temperature conditions, and then subsequently introduced into the urea synthesis reactor for dehydration to urea.

The urea synthesis reactor effluent stream, containing urea, water, unconverted ammonium carbamate and excess ammonia, is divided into a minor and into a major portion. The minor portion thereof is fed to an upper tray of the tray section inside a decomposer separator, and the major portion thereof is fed to the decomposer for decomposition of carbamate to ammonia and carbon dioxide gas and for stripping of the gas from the urea product solution together with excess ammonia and some water vapor.

According to prior art, the carbamate decomposer is heated indirectly in its shell side by condensing steam, and the carbamate decomposer separator overhead off gas containing $NH_3$, $CO_2$ and water vapor is condensed in a cooler in indirect heat exchange with cooling water.

According to prior art, it has not been possible to utilize the decomposer off-gas as a heat source for carbamate decomposition in the decomposer itself, due to the fact that practically no driving force is available to exchange heat indirectly between the condensing decomposer separator off-gas and the urea effluent stream undergoing decomposition of carbamate in the carbamate decomposer at reduced pressure. In order to economically utilize the heat of condensation of the decomposer separator off-gas, according to the prior art it was necessary to operate the decomposition step, absorbing heat from the condensing decomposer separator off-gas, at a much lower pressure than the decomposer separator off-gas itself, for the purpose of attaining a reasonable and economical temperature differential between the condensing off gas and the urea product undergoing decomposition of carbamate. In practice, according to the teaching of the prior art, for example, the decomposer separator off-gas obtained from the first decomposer at 300 psig could only be used to exchange heat indirectly in the shell of the second decomposer to heat the urea product solution undergoing carbamate decomposition in the tube side of the second decomposer at 15 psig, to ensure that the boiling point of the liquid phase formed in the shell of the second decomposer is higher than the boiling point of the urea product solution in the tube side of the second decomposer.

After completion of reaction and heat exchange for heat recovery, the ammoniacal aqueous solution of ammonium carbamate and urea formed from the off-gas — fresh $CO_2$ feed — urea reaction mixture has an overall $NH_3$ to $CO_2$ molar ratio of only about 3.5 to 1, which is far too low to yield a good conversion in the reactor, if introduced into it. As disclosed in the prior art, at this relatively low molar ratio, an uneconomical and low conversion of carbamate to urea in the urea synthesis reactor of about 50–55 percent would be attained, with consequent high steam consumption in the decomposer and consequent larger size equipment required to handle the relatively large amount of decomposer off-gas.

In one prior art process, for example, it would not be possible to increase the overall $NH_3$ to $CO_2$ molar ratio in the reactor above 3.5 to 1 for the purpose of improving the conversion, because this would result in an oversaturation of a first carbamate absorber bottoms solution with ammonia and in consequence exceedingly high ammonia losses of unabsorbed ammonia through the overhead line of the first carbamate absorber.

SUMMARY OF THE INVENTION

In accordance with the present invention, substantial improvement is attained with respect to heat economy by re-introducing the $NH_3$—$CO_2$—$H_2O$ off-gas from the carbamate decomposer separator into the shell side of the carbamate decomposer itself together with fresh $CO_2$ feed and in the presence of urea. The heat of formation of carbamate is transferred from the shell side of the carbamate decomposer to the tube side of the carbamate decomposer, and is utilized to decompose part of the carbamate and to strip part of the excess ammonia from the reactor effluent stream reduced in pressure to facilitate decomposition. However, only part of the total heat required to attain a more complete and substantial decomposition of carbamate in the decomposer can be supplied by the reaction of the fresh $CO_2$ feed with the decomposer separator off-gas, due to the fact that the boiling point of the liquid phase formed in the decomposer shell side from fresh $CO_2$ feed and from decomposer separator off-gas is substantially lower than the final temperature point to which the urea product must be ultimately elevated for more complete decomposition of carbamate. For this reason, in accordance with the present invention the urea product preheated in indirect heat exchange with the fresh $CO_2$ feed-decomposer separator off-gas mixture must be further heated (as with steam) to a relatively higher temperature for more complete decomposition of carbamate.

In accordance with the present invention, it is possible to economically utilize the decomposer separator off-gas as a heat source for carbamate decomposition from the urea product solution at the same pressure as the off-gas itself. The off-gas obtained from a carbamate decomposer at 300 psig can be utilized to give off heat in the shell side of the carbamate decomposer itself and to heat the urea product solution undergoing decomposition of carbamate at 300 psig in the tube side of the decomposer producing said off-gas. This is possible due to the fact that fresh $CO_2$ feed and urea are added to the decomposer separator off-gas, react in the shell side of the carbamate decomposer and give off heat indirectly to the reactor effluent stream undergoing carbamate decomposition in the tube side of the carbamate decomposer at the same pressure as the off-gas supplied to the shell side of said carbamate decomposer. The addition of fresh $CO_2$ feed has the purpose of decreasing the $NH_3$ to $CO_2$ molar ratio of the reacting mixture and thus of increasing the boiling point of the liquid phase formed thereof. The addition of urea to the reacting mixture of decomposer off-gas and fresh $CO_2$ feed has been found to have the dually beneficial effect of contributing substantially to the increase in the boiling point of the liquid phase formed from the reaction of the decomposer separator off-gas with the fresh $CO_2$ feed, and of decreasing the crystallization point of said liquid phase.

The off-gas - fresh $CO_2$ feed - urea reaction mixture discharged from the shell side of the decomposer can be used further to heat other process streams within the process when mixed with additional fresh $CO_2$ feed.

Also in accordance with the present invention, an ammoniacal aqueous solution of ammonium carbamate and urea formed from off-gas - fresh $CO_2$ feed - urea reaction mixture with an overall $NH_3$ to $CO_2$ molar ratio of about 3.5 to 1, after completion of reaction and heat exchange for heat recovery with various streams within the process, is further cooled (as with water) and mixed with fresh $NH_3$ feed for the purpose of enriching the liquid phase in ammonia content, such as to bring the $NH_3$ to $CO_2$ overall molar ratio to at least above about 3.8 to 1. This final solution, thus enriched in ammonia content, is then introduced into the urea synthesis reactor with the remaining portion of the fresh $CO_2$ feed for conversion to urea. A minor amount of ammonia can be added directly to the reactor, as required.

In accordance further with the present invention, the free ammonia present in the gaseous phase of a final water cooled condenser is totally absorbed in the carbamate solution and is pumped into the reactor, notwithstanding the relatively high $NH_3$ to $CO_2$ overall molar ratio in the final carbamate solution from the water cooled condenser and in the reactor. This is possible due to the presence of urea in the final carbamate solution, which has been found to have the property of considerably increasing the solubility of free ammonia in an aqueous solution of ammonium carbamate, and at the same time of lowering the crystallization point of the resulting carbamate solution, thus allowing operation of the water cooled final condenser at a much lower temperature than heretofore disclosed by known art.

The terms — fresh $CO_2$ feed - and - fresh $NH_3$ feed — in this invention are used to define the substantially stoichiometric amounts of $CO_2$ and $NH_3$ required to form urea in the synthesis reactor, and introduced into the urea synthesis process from an external source. Said $CO_2$ and $NH_3$ fresh feeds are eventually discharged from the urea synthesis system as the stoichiometric amount of urea product.

DRAWINGS

FIGS. 1-A - 1-B are flow sheets illustrating the invention, and

DESCRIPTION OF PREFERRED EMBODIMENT

Figure 1A:
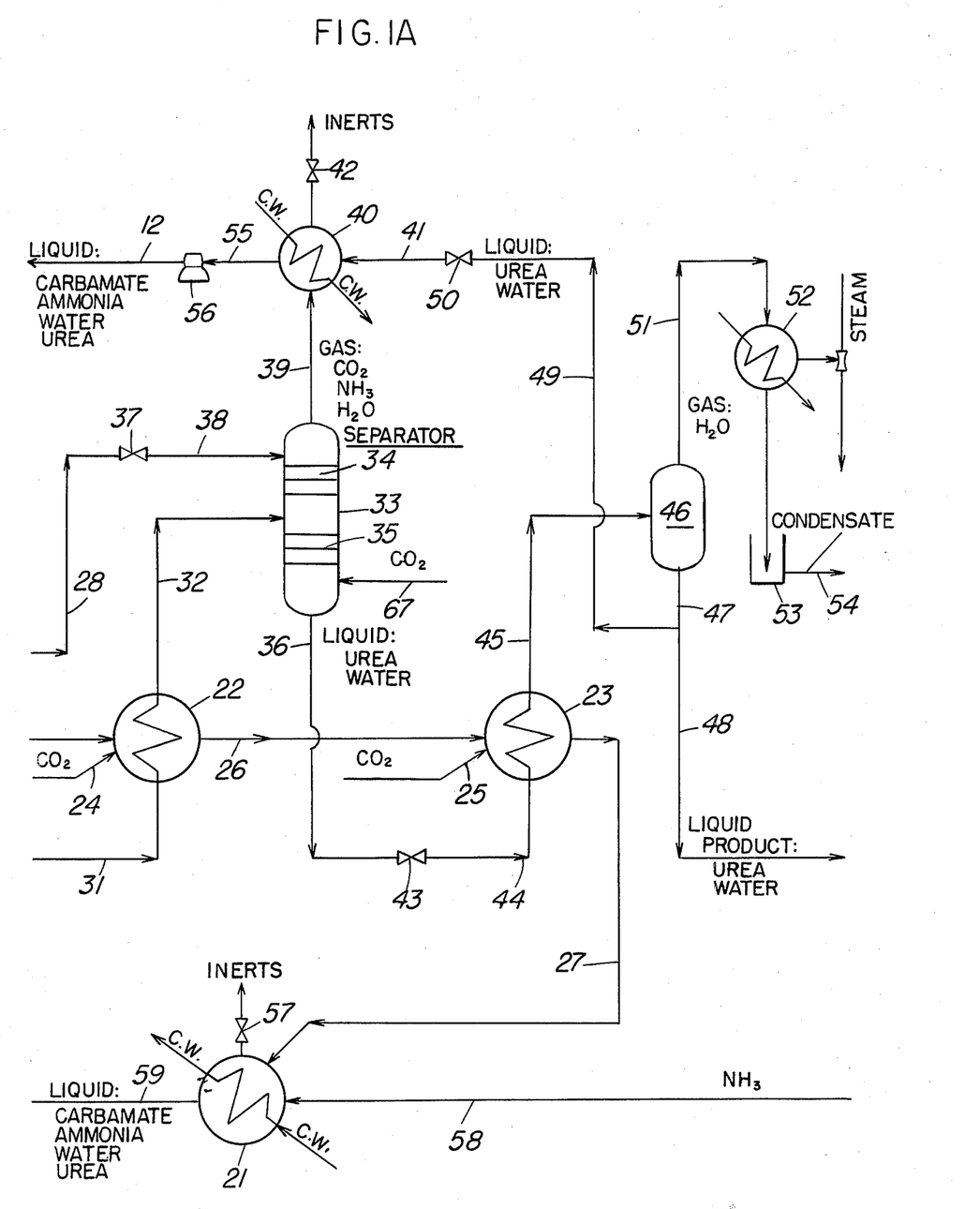
Figure 1B:
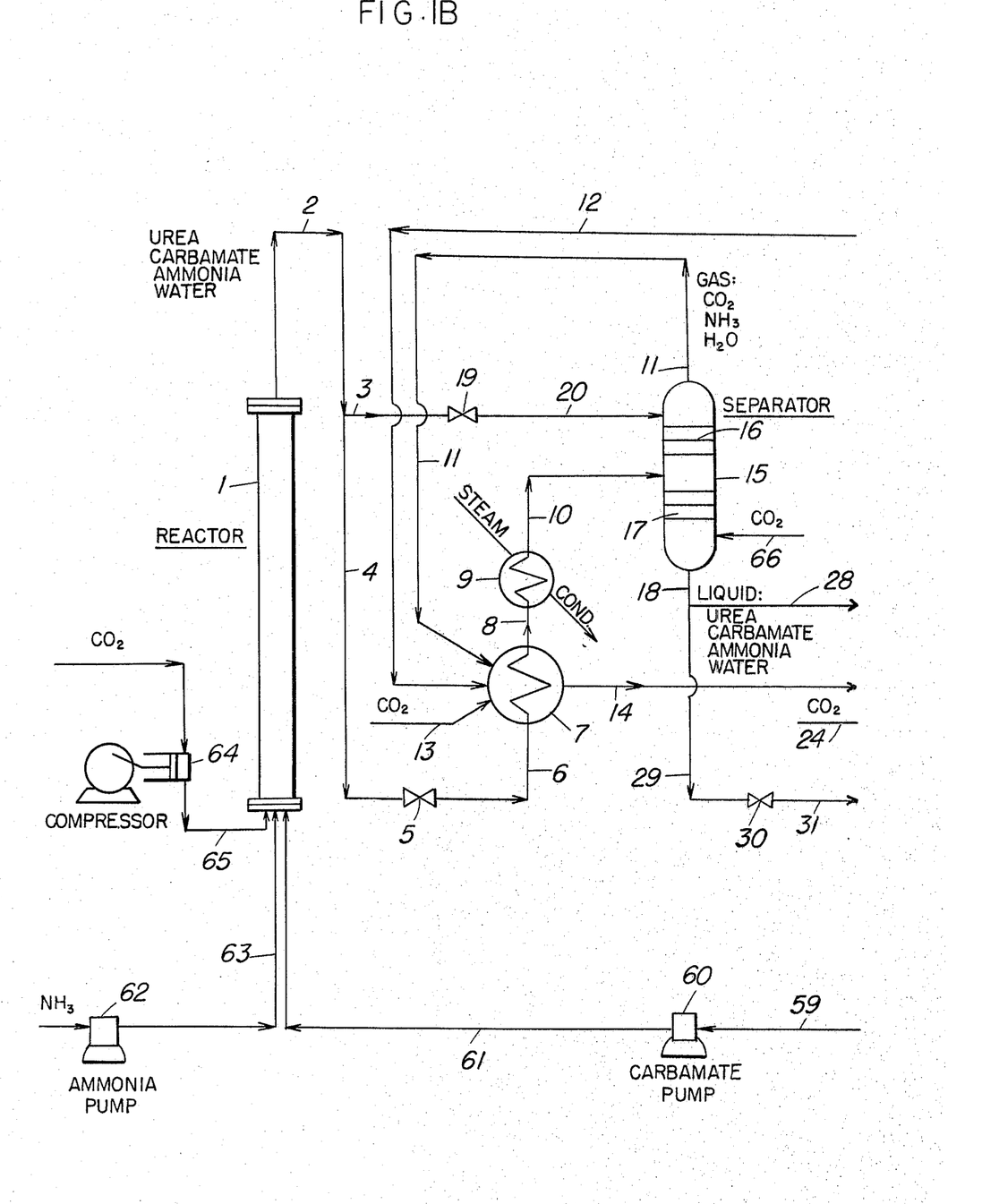

Referring to FIGS. 1-A - 1-B, reactor 1 is operated at an overall $NH_3$ to $CO_2$ molar ratio in a range of from about 3.8 to 1 to about 6.5 to 1, in a pressure range of from about 1,800 psig to about 6,000 psig and in a temperature range of from about 320°F. to about 430°F. The preferred approximate operating conditions are respectively as follows: $NH_3$ to $CO_2$, 4.0:1; pressure, 3,200 psig; and temperature, 370°F. Preferably, a conversion of about 72 percent per pass is attained in the synthesis reactor. Reactor effluent in line 2 is split into a minor portion in line 3 and into a major portion in line 4, analogously to the diclosure in my application Ser. No. 50,777. The stream in line 4 is reduced in pressure through pressure reducing valve 5 in the range of from about 150 psig to about 600 psig, preferably to about 340 psig, and is introduced into decomposer 7 through line 6. Decomposer 7 can be a conventional carbamate decomposer, preferably of the vertical shell and tube type with the urea product solution in the tube side and the reacting off-gas in the shell side.

Urea product solution from line 6 is heated in decomposer 7 from its substantially flash temperature in line 6 to a temperature which is about 20°-30°F. higher than said flash temperature. The flash temperature in line 6 will depend primarily upon the pressure to which the reactor effluent from line 4 is let down through reducing valve 5. For a let down pressure range in line 6 of from about 150 psig to about 600 psig, the corresponding flash temperature in line 6 will be from about 170°F. to about 290°F., respectively. Preferably the pressure down stream of reducing valve 5 is maintained at about 340 psig, and the flash temperature of the mixture in line 6 is about 245°F. By heating the mixture from line 6 in decomposer 7 to a temperature which is 20°-40°F. higher than in line 6, from about 10 percent to about 60 percent of the carbamate originally contained in line 6 is decomposed to $NH_3$ and $CO_2$ gas and these gases are expelled from the urea product solution together with excess ammonia and some water vapor. By preferably heating the mixture from line 6 from about 245°F. to about 275°F., about 55 percent of the carbamate contained in line 6 is decomposed to a mixture of gases.

The endothermic heat required to decompose carbamate from the urea product solution in decomposer 7 is provided by the heat of reaction of a mixture of fresh $CO_2$ feed, decomposer separator off-gas and a weak aqueous ammoniacal solution of ammonium carbamate containing urea, as described further below. Said mixture preferably reacts in the shell side of heat exchanger 7, functioning as a decomposer, and indirectly exchanges its heat of reaction with the urea product solution undergoing heating and carbamate decomposition, preferably in the tube side of heat exchanger 7. The temperature attained by the mixture reacting in the shell side of decomposer 7 depends primarily upon the pressure at which the reaction in the shell side of decomposer 7 occurs. For the pressure range of from about 150 psig to about 600 psig, such a reaction temperature will range from about 200°F. to about 330°F., respectively, and it will be about 285°F. at the preferred operating pressure of about 330 psig in the shell side of decomposer 7. Thus, sufficient temperature differential and heat transfer driving force is attained between the reacting mixture in the shell side of decomposer 7 and the urea product solution undergoing carbamate decomposition in the tube side of decomposer 7.

The urea product solution heated in decomposer 7 is directly fed into steam heated decomposer 9 through line 8 for further heating and more complete carbamate decomposition. Similarly to decomposer 7, decomposer 9 can be a conventional carbamate decomposer; and preferably, it consists of a vertical shell and tube heat exchanger type carbamate decomposer with the urea product solution in its tube side and condensing steam in its shell to supply the required amount of heat.

The temperature to which the urea product solution from line 8 is heated in decomposer 9 for more complete carbamate decomposition depends upon the pressure at which the urea product solution is heated. For the presure range of from about 150 psig to about 600 psig, the corresponding temperature to which the urea product solution in decomposer 9 is heated for more complete carbamate decomposition is in the range of from about 240°F. to about 350°F., respectively. At a preferred pressure of about 340 psig, the urea product solution from line 8 is heated in decomposer 9 to about 315°F. The steam heated urea product solution is withdrawn from decomposer 9 through line 10. Line 10 contains a mixture of a liquid phase comprising urea, water, residual ammonium carbamate and residual excess ammonia, and a gaseous phase comprising $CO_2$, $NH_3$ and $H_2O$. The residual ammonium carbamate in the liquid phase of line 10 is only about 5–25 percent of the original amount of ammonium carbamate contained in line 4, and preferably about 10 percent of said amount.

Figure 2:
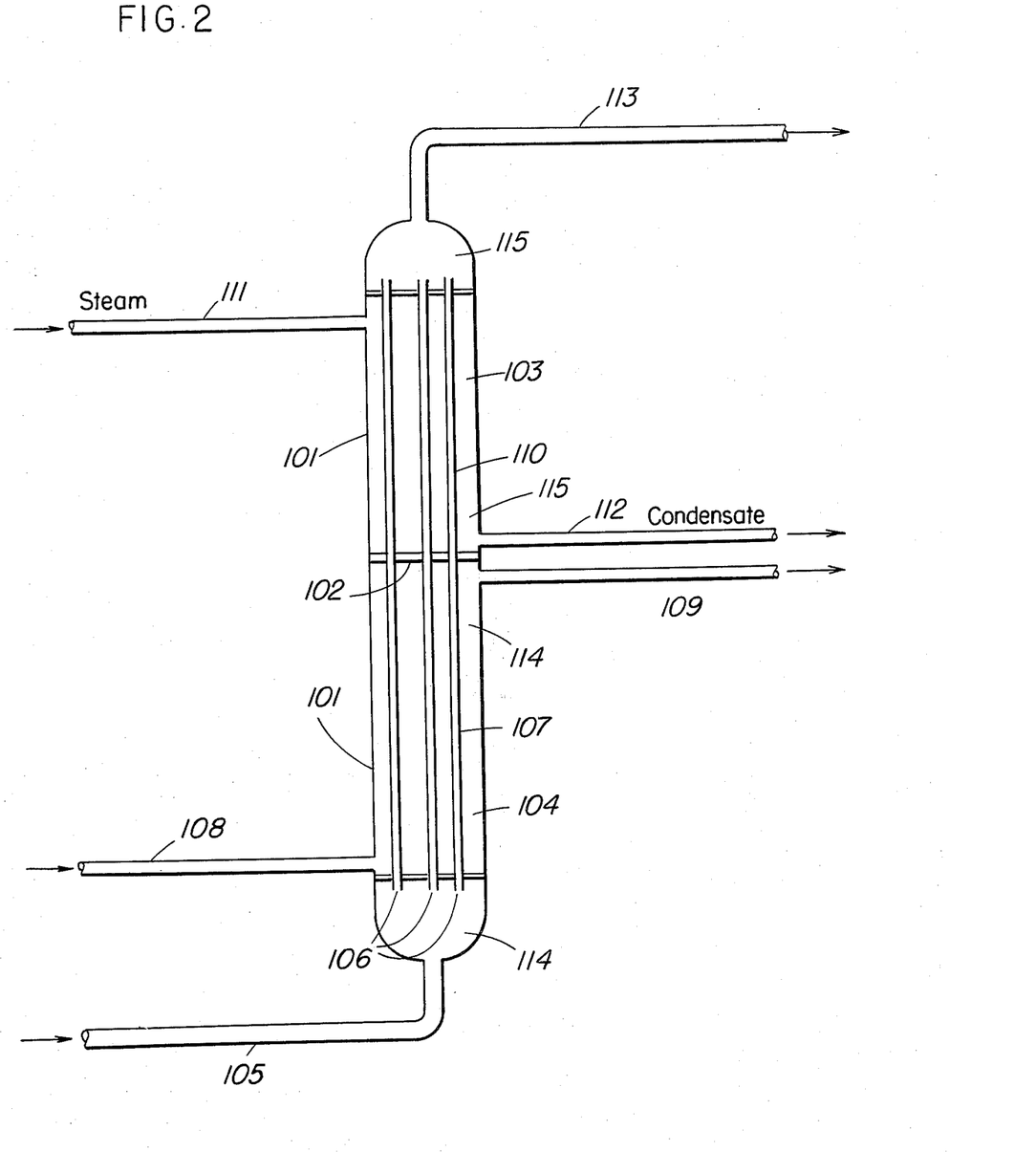
FIG. 2 is a schematic diagram of a preferred decomposer.

In FIG. 2, a preferred embodiment of decomposers 7 and 9 above is illustrated. Separate decomposers 7 and 9 comprise a single integral, vertical shell and tube heat exchanger 101 provided with partition 102 which separates upper steam heated shell side 103 from lower reaction mixture heated shell side 104. The urea product solution from line 6 of FIG. 1 is passed through line 105 of FIG. 2 into the bottom part of tube side 106 of integral decomposer 101. Tube side 106 is continuous through said lower shell side 104 and upper shell side 103 of integral decomposer 101. The urea product solution from line 105 is heated in lower portion 107 of tube side 106 to decompose part of the carbamate contained in the liquid phase of the mixture in line 105. The endothermic heat of decomposition is supplied by a stream of fresh $CO_2$ feed of line 13 of FIG. 1, a stream of decomposer separator off-gas of line 11 of FIG. 1, and a stream of weak ammoniacal aqueous solution of ammonium carbamate containing urea from line 12 of FIG. 1. Said streams of lines 13, 11 and 12 are introduced into the bottom section of lower shell side 104 of FIG. 2 through line 108, and the heat of reaction thereof supplies the endothermic heat required to decompose carbamate in the lower tube section 107.

A reaction mixture is withdrawn from the upper section of lower shell side 104 through line 109, delivered to line 14 of FIG. 1 and processed as described further below.

Returning to FIG. 2, the urea product solution heated in lower part 107 of tube side 106 is passed directly into the upper part 110 of tube side 106 for further steam heating. Steam is supplied through line 111 into the upper portion of upper shell side 103 of integral heat exchanger 101; the steam provides heat to the urea product inside upper tube side 110 by condensing on the external surface of upper tube side 110. The steam condensate thus formed is extracted through line 112 from the bottom section of upper shell 103.

As indicated above, the upper shell side 103 is sealed off from lower shell side 104 by means of partition 102. The urea product solution heated in upper tube section 110 is withdrawn from the upper section of integral heat exchanger 101 through overhead line 113 and is delivered to line 10 of FIGS. 1-A - 1-B for further processing as described further below. The lower section 114 of integral heat exchanger 101 of FIG. 2 corresponds to decomposer 7 of FIGS. 1-A - 1-B, and upper section 115 of integral heat exchanger of FIG. 2 corresponds to decomposer 9 of FIGS. 1-A - 1-B. Line 8 connecting decomposer 7 with decomposer 9 of FIGS. 1-A - 1-B is deleted in integral heat exchanger 101 of FIG. 2 because lower tube section 107 is directly connected with upper tube section 110 at partition 102 which divides the lower shell side 104 from the upper shell side 103.

Returning to FIG. 1, the mixture of liquid and gas from line 10 is introduced into an intermediate section of decomposer separator 15, provided with upper tray section 16 and lower tray section 17. Analogously to the disclosure in my application Ser. No. 50,777, the liquid phase of line 10 is separated from the gaseous phase therein inside separator 15. The liquid phase containing urea, water, residual ammonium carbamate and excess ammonia, flows downwardly through tray section 17 and is stripped with $CO_2$ from line 66 for removal of the major part of residual excess ammonia in lower tray section 17. The degassed liquid phase collected in the bottom section of decomposer separator 15 is discharged from it through bottom line 18. The gaseous phase separated from the mixture of line 10 inside decomposer separator 15, is passed upwardly through upper tray section 16 for removal of a major part of water vapor in counter-current direct contact with relatively colder urea reactor effluent mixture supplied to the top tray of upper tray section 16 through pressure reducing valve 19 and through line 20. The total amount of gaseous phase leaves decomposer separator 15 overhead through line 11 as decomposer separator off-gas containing $CO_2$, $NH_3$ and $H_2O$. The $NH_3$ to $CO_2$ molar ratio in line 11 is in the range of from about 4 to 1 to about 15 to 1, preferably in the range of about 8.5 to 1. The off-gas from line 11 is introduced into the shell side of decomposer 7, together with a stream of weak carbamate solution containing urea from line 12, obtained within the process as explained further below.

If one tried to react the stream of off-gas from line 11 with solution from line 12 alone, as usually done heretofore in accordance with prior art, the boiling point of the liquid phase formed by reaction of decomposer separator off-gas from line 11 with solution from line 12 would be practically at the same temperature level as the flash temperature of the reactor effluent mixture in line 6 after pressure reduction through reducing valve 5. Thus, no driving force would be available to transfer heat from the mixture reacting in shell side of decomposer 7 and the urea product solution undergoing carbamate decomposition in decomposer 7.

It has been found that by adding fresh $CO_2$ feed to the mixture of decomposer separator off-gas and weak carbamate solution containing urea, the boiling point of the resulting liquid phase formed thereof is considerably increased, thus allowing heat transfer between the reacting mixture and the urea product solution undergoing carbamate decomposition and providing the stream of decomposer separator off-gas itself. This is due to the fact that the fresh $CO_2$ feed in line 13 introduced into the mixture reacting in the shell side of decomposer 7, which provides heat to decomposer 7, lowers the overall $NH_3$ to $CO_2$ molar ratio in said reacting mixture and thus lowers the vapor pressure of the liquid phase formed thereof.

Fresh $CO_2$ feed is added to decomposer 7 through line 13 in an amount sufficient to decrease the $NH_3$ to $CO_2$ molar ratio of the mixture in line 14 leaving the shell side of decomposer 7, below the $NH_3$ to $CO_2$ molar ratio of the decomposer separator off-gas in overhead line 11 of decomposer separator 15. For instance, if the molar ratio in line 11 is about 4 to 1, a sufficient amount of fresh $CO_2$ feed is admixed to the shell side of decomposer 7 through line 13 to attain a molar ratio of about 2.5 to 1 in the mixture leaving the shell side of decomposer 7 through line 14. Analogously, if the molar ratio in line 11 is about 15 to 1, fresh $CO_2$ feed is admixed to the shell side of decomposer 7 through line 13 to attain a molar ratio of about 10 to one in the mixture leaving the shell side of decomposer 7 through line 14. Preferably, when the $NH_3$ to $CO_2$ molar ratio in the decomposer off-gas line of line 11 is in the range of about 8–9 to 1, fresh $CO_2$ feed is added through line 13 to the off-gas reacting in shell side of decomposer 7 in an amount sufficient to maintain the $NH_3$ to $CO_2$ molar ratio in the mixture leaving shell side of decomposer 7 through line 14 in the range of about 4.6–4.9 to 1. Consequently, the boiling point of the liquid phase formed in the shell side of decomposer 7 is increased to about 285°F., thus allowing heat transfer from the shell side to the tube side of decomposer 7, at a considerable saving in utilities. As explained above, however, the urea product from line 8 is steam heated further in decomposer 9 for more complete carbamate decomposition.

The combination of decomposers 7 and 9 as described in the present invention allows for a substantial degree of heat recovery within the urea synthesis process in a very simple and economical manner, compared to the teachings of the prior art, and results in a substantial decrease in utility consumption.

The mixture of liquid and gas leaving the shell side of decomposer 7 can be mixed very advantageously with additional fresh $CO_2$ feed in heat exchange with other process streams within the urea process for heat recovery, before final cooling with cooling water in cooler 21, as for instance in second decomposer 22 and urea concentrator 23. For preferred operation described above, in which the amount of fresh $CO_2$ feed added to the reaction mixture in the shell side of decomposer 7 is sufficient to provide a molar ratio of about 4.6–4.9 to 1 in the mixture of line 14, fresh $CO_2$ feed is added through lines 24 and 25 to second decomposer 22 and urea concentrator 23, respectively, in an amount sufficient to maintain a molar ratio in lines 26 and 27 leaving the shell side of each of second decomposer 22 and urea concentrator 23, respectively, at about 4.0 to 1 and at about 3.5 to 1. However, alternatively, a larger amount of fresh $CO_2$ feed can be added to decomposer 7 through line 13 to maintain the $NH_3$ to $CO_2$ molar ratio in the mixture in line 14 at about 3.5 to 1 for more extensive heat recovery in decomposer 7, if so desired. In such case, second decomposer 22 and urea concentrator 23 are steam heated with steam imported from an external source (not shown).

Urea product solution leaving the bottom section of decomposer separator 15 through bottom line 18 is again divided into a minor portion in line 28 and into a major portion in line 29, in accordance with my application Ser. No. 50,777, reduced in pressure to about 10 psig through level control valve 30, and is introduced through line 31 into second decomposer 22 for further heating and degassing to substantially pure aqueous urea solution. The urea product solution, heated in second decomposer 22, is delivered through line 32 into an intermediate section of second decomposer separator 33, provided with upper tray section 34 and lower tray section 35. The liquid phase of line 32 is separated from its gaseous phase inside separator 33. The liquid phase containing substantially pure aqueous urea solution flows downwardly through tray section 35 and is stripped with $CO_2$ from line 67 for removal of residual ammonia. Degassed aqueous urea solution collected in the bottom section of separator 33 is discharged from it through bottom line 36. A gaseous phase of the mixture in line 32 is separated inside separator 33 and is passed upwardly through upper tray section 34 for removal of a major part of water vapor in counter current direct contact with relatively colder solution from line 28 supplied to the top tray of upper tray section 34 through reducing valve 37 and line 38. The total amount of gaseous phase leaves decomposer separator 33 overhead through line 39 as off gas containing $CO_2$, $NH_3$ and $H_2O$, and is condensed to solution in water cooled condenser 40 and is mixed with urea fed to condenser 40 through line 41. Inerts can be vented through vent valve 42.

Urea product solution from line 36 is delivered through valve 43 and line 44 to urea concentrator 23 operating under vacuum. The resulting heated urea product solution is delivered from concentrator 23 through line 45 to separator 46. Concentrated urea solution is withdrawn from separator 46 through bottom line 47, and is delivered through line 48 to other units (not shown) for further processing. Part of the concentrated urea solution from line 47 is delivered through line 49 and regulating valve 50 into second condenser 40 through line 41. Water vapor separated in separator 46 is delivered through overhead line 51 to water cooled vacuum condenser 52, condensed to liquid and collected in hotwell 53 for discharge through line 54.

A liquid phase formed in second condenser 40 and containing ammonium carbamate, excess ammonia, urea and water is discharged through line 55, elevated in pressure through pump 56 and delivered to the shell side of decomposer 7 through line 12, as described above.

In the process of the present invention, the amount of urea in line 12 is sufficient to maintain the weight ratio of urea $H_2O$ in the mixture leaving the shell side of decomposer 7 through line 14 in the range of from about 0.1 to about 1.6 to 1, preferably about 1:1.

The reaction mixture from line 27 above (or from line 14 if second decomposer 22 and urea concentrator 23 are by passed) is delivered into condenser 21 for cooling and total condensation. Condenser 21 operates essentially in the same pressure ranges as the urea product solution side of decomposers 7 and 9, separator 15 and shell side of decomposer 7, allowing for some pressure drop in the lines connecting said vessels. Inerts accumulated inside condenser 21 can be vented through vent valve 57. Fresh $NH_3$ feed is supplied to condenser 21 through line 58 in an amount sufficient to maintain the overall $NH_3$ to $CO_2$ molar ratio in the solution discharged from condenser 21 through line 59 in the range of from about 3.8 to 1 to about 7 to 1, preferably in the range of from about 4.7 to 1 to 5.5 to 1. Condenser 21 can be operated in the temperature range of from about 120°F. to about 250°F., preferably in the range of from about 180°F. to about 210°F. The solution discharged from condenser 21 through line 59 is elevated in pressure in pump 60 and is delivered through line 61 to reactor 1 for recovery.

The remaining part, if any, of fresh $NH_3$ feed is elevated in pressure in pump 62 and is delivered through line 63 into reactor 1.

The remaining part of fresh $CO_2$ feed is compressed to reactor pressure in compressor 64 and is delivered into reactor 1 through line 65.

Substantially all of the $CO_2$ in lines 65, 13, 66, 24, 67 and 25 and substantially all of the $NH_3$ in lines 58 and 63 are eventually reacted to form the stoichiometric amount of urea in reactor 1, which urea is ultimately discharged from the system through line 48 as product.

The invention is illustrated further by the following examples.

EXAMPLE 1

Referring to FIGS. 1-A - 1-B and 2, 6,500 pounds of carbon dioxide are compressed in compressor 64 and delivered through line 65 to reactor 1, together with 5,200 pounds of $NH_3$ elevated in pressure in pump 62 and delivered through line 63 to reactor 1, and together with 63,152 pounds of ammonium carbamate recycle solution from line 61. The carbamate recycle solution contains 16,902 pounds of $CO_2$ as carbamate, 31,000 pounds of total ammonia as carbamate and free ammonia, 7,750 pounds of water and 7,500 pounds of urea. Reactor 1 operates at approximately 3,200 psig and 370°F. At completion of reaction, the reactor contents are discharged through line 2; such discharge comprises 30,480 pounds of urea, 6,550 pounds of $CO_2$ as unconverted carbamate, 23,178 pounds of total ammonia as carbamate and free ammonia, and 14,644 pounds of water. About 30 percent of the reactor effluent in line 2 is passed into line 3 and the remaining 70 percent is passed into line 4. The reactor mixture in line 4 is reduced in pressure to 340 psig through reducing valve 5, flash-cooled to about 245°F. in line 6 and, through line 105 of FIG. 2, is passed into the bottom section 114 of integral decomposer 101. The resulting solution is passed upwardly through tubes 106 and it is heated ultimately to 315°F. by the time it leaves decomposer 101 through overhead line 113.

5,000 pounds of $CO_2$ in line 13, 17,350 pounds of solution in line 12 and 28,458 pounds of off gas in line 11, are passed through line 108 into lower shell side 104 of decomposer 101. The solution in line 12 contains 1,000 pounds of $CO_2$ as carbamate, 2,900 pounds of total ammonia as carbamate and as free ammonia, 5,950 pounds of water and 7,500 pounds of urea. The off gas in line 11 contains 6,380 pounds of $CO_2$, 20,278 pounds of $NH_3$ and 1,800 pounds of $H_2O$. The mixture of line 108 reacts in lower shell 104, and its temperature increases to 285°F.; part of its heat of reaction is transferred through the walls of tubes 107 to heat the urea product solution flowing through the tubes and the mixture is discharged through line 109 into line 14. 150 psig steam is supplied to upper shell side 103 through line 111 to heat the fluid in tubes 110 to 315°F. Steam condensate is discharged through line 112. The heated fluid is discharged from decomposer 101 through line 113, and it is introduced into separator 15 of FIGS. 1-A - 1-B through line 10. 500 pounds of $CO_2$ are supplied to lower tray section 17 of separator 15 through line 66. The reactor effluent from line 3 is reduced in pressure to 330 psig, through reducing valve 19, flash-cooled to about 245°F. and supplied to the top tray of tray section 16 through line 20. Off gas is discharged from separator 15 through its overhead line 11 and is delivered at about 330 psig into lower shell side 104, as described above. The difference in pressure of about 10 psi between the fluid in line 6 and the fluid in line 11 is mainly due to friction losses in tubes 106, line 113, tray section 16 and line 11. In all other respects, substantially the same pressure of the inside of separator 15 prevails inside lower shell side 104 of integral decomposer 101.

The liquid phase from the bottom section of separator 15 is discharged through line 18; this discharge contains 30,480 pounds of urea, 670 pounds of $CO_2$ as carbamate, 2,900 pounds of total $NH_3$ as carbamate and as free ammonia, and 12,844 pounds of water. About 30 percent of the solution in line 18 is diverted into line 28, the remaining 70 percent through line 29 is reduced in pressure to about 10 psig through valve 30 and is passed through line 31 into decomposer 22. The fluid from line 31 is heated indirectly in decomposer 22 to 250°F. and is passed through line 32 into separator 33. The heat of decomposition is supplied in decomposer 22 by reacting in its shell side 50,808 pounds of reaction mixture from line 14 and 2,500 pounds of $CO_2$ supplied through line 24. The mixture in line 14 at about 320 psig pressure, contains a total of 12,380 pounds of $CO_2$, 23,178 pounds of total ammonia, 7,750 pounds of water and 7,500 pounds of urea. After completion of reaction 53,308 pounds of resulting reaction mixture is discharged from the shell side of decomposer 22 at about 270°F. and about 310 psig pressure through line 26; this discharge contains 14,880 pounds of total $CO_2$, 23,178 pounds of total $NH_3$, 7,750 pounds of water and 7,500 pounds of urea.

330 pounds of $CO_2$ are supplied to bottom tray section 35 of separator 33, and the solution from line 28 is reduced in pressure through valve 37 to 5 psig and is supplied through line 38 to the top tray of tray section 34 of separator 33. Off gas is discharged from separator 33 through its overhead line 39; the off gas contains 1,000 pounds of $CO_2$, 2,900 pounds of $NH_3$ and 4,730 pounds of $H_2O$. The bottom solution, discharged from separator 33 through bottom line 36, contains 30,480 pounds of urea and 8,114 pounds of water. The flow of urea solution in line 36 is regulated by valve 43, and this urea solution is delivered to urea concentrator 23 through line 44 for indirect heating to 230°F. under a negative pressure of 7 psia for concentration. The heated fluid is delivered through line 45 into separator 46 in which concentrated urea is separated from water vapor. 30,480 pounds of urea and 4,960 pounds of water are discharged through line 47 and 3,150 pounds of water vapor is discharged overhead through line 51. The fluid from line 51 is condensed in vacuum condenser 52, collected in hotwell 53 and is discharged through line 54.

7,500 pounds of urea and 1,220 pounds of water are withdrawn from line 47 for recycle into the synthesis process, and the remaining portion of 26,720 pounds of urea solution containing 22,980 pounds of urea and 3,740 pounds of water is discharged through line 48 as final product, for further processing if desired. The urea solution from line 49 is elevated in pressure through a pump (not shown), regulated through valve 50 and delivered into second condenser 40 through line 41. Condenser 40 is water cooled and operates at about 5 psig and 100°F. Off gas from line 39 is introduced into condenser 40 for condensation and reaction, and 17,350 pounds of solution is discharged through line 55. Inerts can be vented through valve 42. The solution in line 55, containing 1,000 pounds of $CO_2$ as carbamate, 2,900 pounds of total ammonia as carbamate and as free ammonia, 5,950 pounds of water and 7,500 pounds of urea, is elevated in pressure by pump 56 and is delivered to the shell side of decomposer 7 through line 12.

The heat of evaporation in concentrator 23 is supplied by mixing in its shell side the mixture in line 26 with 2,022 pounds of $CO_2$ supplied through line 25. After completion of reaction, 55,330 pounds of reaction mixture are discharged through line 27 at about 300 psig and about 250°F.

The difference in pressure between separator 15 and line 27 is due to friction losses and hydraulic head losses, which in this case account for about 40 psi. In all other respects the pressure in separator 15 is substantially at the same level as the pressure at the end of line 27, connecting into first condenser 21. The solution from line 27, containing 16,902 pounds of $CO_2$ as carbamate, 23,178 pounds of total ammonia as carbamate and free ammonia, 7,750 pounds of water and 7,500 pounds of urea is delivered into condenser 21 for cooling to 190°F. at about 300 psig and mixing with 7,822 pounds of ammonia delivered through line 58 to condenser 21. The resulting solution is discharged from condenser 21 through line 59, elevated in pressure by means of high pressure pump 60 and is delivered through line 61 to reactor 1. Inerts accumulated in condenser 21 are vented through vent valve 57.

Substantially all of the ammonia added to condenser 21 through lines 27 and 58 is absorbed in the solution being cooled in condenser 21 and is discharged through line 59 for delivery to the reactor.

EXAMPLE 2

The procedure of this example is the same as that described in Example 1, except for the operating pressure in condenser 21, which is raised to about 400 psig and the temperature therein is lowered to about 175°F. to increase the capability of the solution in condenser 21 to absorb a larger amount of free ammonia. 13,022 pounds of ammonia are delivered to first condenser 21 through line 58, and the solution in line 59 contains 16,902 pounds of $CO_2$ as carbamate, 36,200 pounds of total ammonia as carbamate and as free ammonia, 7,750 pounds of water and 7,500 pounds of urea. The high pressure liquid ammonia pump 62 is omitted as well as line 63. The pressure in separator 15 and shell side of decomposer 7 is raised in proportion to the increase in pressure in condenser 21.

What is claimed is:

1. In an urea synthesis process wherein a first aqueous urea solution comprising urea, ammonium carbamate, ammonia and water is produced at elevated temperature and elevated pressure,
   the improvement which comprises:
   a. reducing said pressure of, and heating, said first aqueous urea solution in a first carbamate decomposing zone to decompose from about 10 to about 60 percent by weight of the ammonium carbamate therein to $NH_3$ and $CO_2$ gas,
   b. then heating said heated first aqueous urea solution in a second carbamate decomposing zone to decompose additional ammonium carbamate to $NH_3$ and $CO_2$ gas, and to produce a liquid phase comprising urea, water, residual ammonium carbamate and residual excess ammonia, and a gaseous phase comprising $CO_2$, $NH_3$ and $H_2O$;
   c. separating said gaseous phase and said liquid phase;
   d. contacting said gaseous phase, urea and fresh $CO_2$ to form ammonium carbamate in indirect heat exchange with said first aqueous urea solution, whereby heat of reaction released in forming said ammonium carbamate in (d) provides heat for (a), the quantity of urea so contacted being such that the reaction product has a ratio of urea to water of from about 0.1/1 to about 1.6/1.

2. The process of claim 1, wherein the pressure of said gaseous phase is substantially the same as the pressure of said first carbamate decomposing zone.

3. The process of claim 1, wherein the reaction product of (d) containing ammonium carbamate is mixed with fresh $NH_3$ subsequent to said contact in (d) and in a zone separate from (d) to provide a reaction mixture having an overall molar ratio of $NH_3$ to $CO_2$ of at least above about 3.8/1 and charging said reaction mixture to an urea synthesis reactor operated at urea synthesis conditions.

4. The process of claim 1, wherein the temperature of said first aqueous urea solution, at a pressure of from about 150 psig to about 600 psig, is increased to from about 20°F. to about 40°F. in (a).

5. The process of claim 1, wherein said first carbamate decomposing zone is operated at a temperature of from about 190°F. to about 330°F. and a pressure of from about 150 psig to about 600 psig in (a).

6. The process of claim 1, wherein the temperature of said heated first aqueous urea solution, at a pressure of from about 150 psig to about 600 psig, is increased to from about 20°F. to about 40°F. in (b).

7. The process of claim 1, wherein the said second carbamate decomposing zone is operated at a temperature of from about 240°F. to about 350°F., which temperature is from about 20°F. to about 40°F. higher than the temperature in said first carbamate decomposing zone after heating, and a pressure of from about 150 psig to about 600 psig.

8. The process of claim 1, wherein said heated first aqueous urea solution is passed directly from (a) to (b).

9. In an urea synthesis process wherein an off-gas containing $CO_2$, $NH_3$ and $H_2O$ is separated, the improvement which comprises
  a. adding urea to said off-gas and removing heat therefrom to produce a liquid stream, said liquid stream having an $NH_3/CO_2$ ratio of from about 3.8/1 to about 7:1 and urea/$H_2O$ ratio of from about 0.1/1 to about 1.6/1, and
  b. charging said liquid stream to an urea synthesis reactor operated at urea synthesis conditions.

10. The process of claim 9, wherein fresh $CO_2$ is also added in (a).

11. The process of claim 9, wherein fresh $NH_3$ is also added in (a).

12. The process of claim 9, wherein fresh $CO_2$ and fresh $NH_3$ are also added in (a).

* * * * *

UNITED STATES PATENT OFFICE
CERTIFICATE OF CORRECTION

PATENT NO. : 3,886,210
DATED : May 27, 1975
INVENTOR(S) : IVO MAVROVIC

It is certified that error appears in the above-identified patent and that said Letters Patent are hereby corrected as shown below:

Column 5, lines 46, 55, 56, 59 and 66 and
Column 6, line 28 - after "FIG." change "1" to ---1-A - 1-B---.

Signed and Sealed this sixteenth Day of December 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,886,210
DATED : May 27, 1975
INVENTOR(S) : IVO MAVROVIC

It is certified that error appears in the above–identified patent and that said Letters Patent are hereby corrected as shown below:

Abstract - line 23 - "$HN_3$" should be ---$NH_3$---.

Signed and Sealed this

Twenty-seventh Day of July 1976

[SEAL]

Attest:

RUTH C. MASON
*Attesting Officer*

C. MARSHALL DANN
*Commissioner of Patents and Trademarks*